Jan. 25, 1966  R. G. NUTTING ETAL  3,230,687
PACKAGING MACHINE
Filed April 10, 1961  16 Sheets-Sheet 9
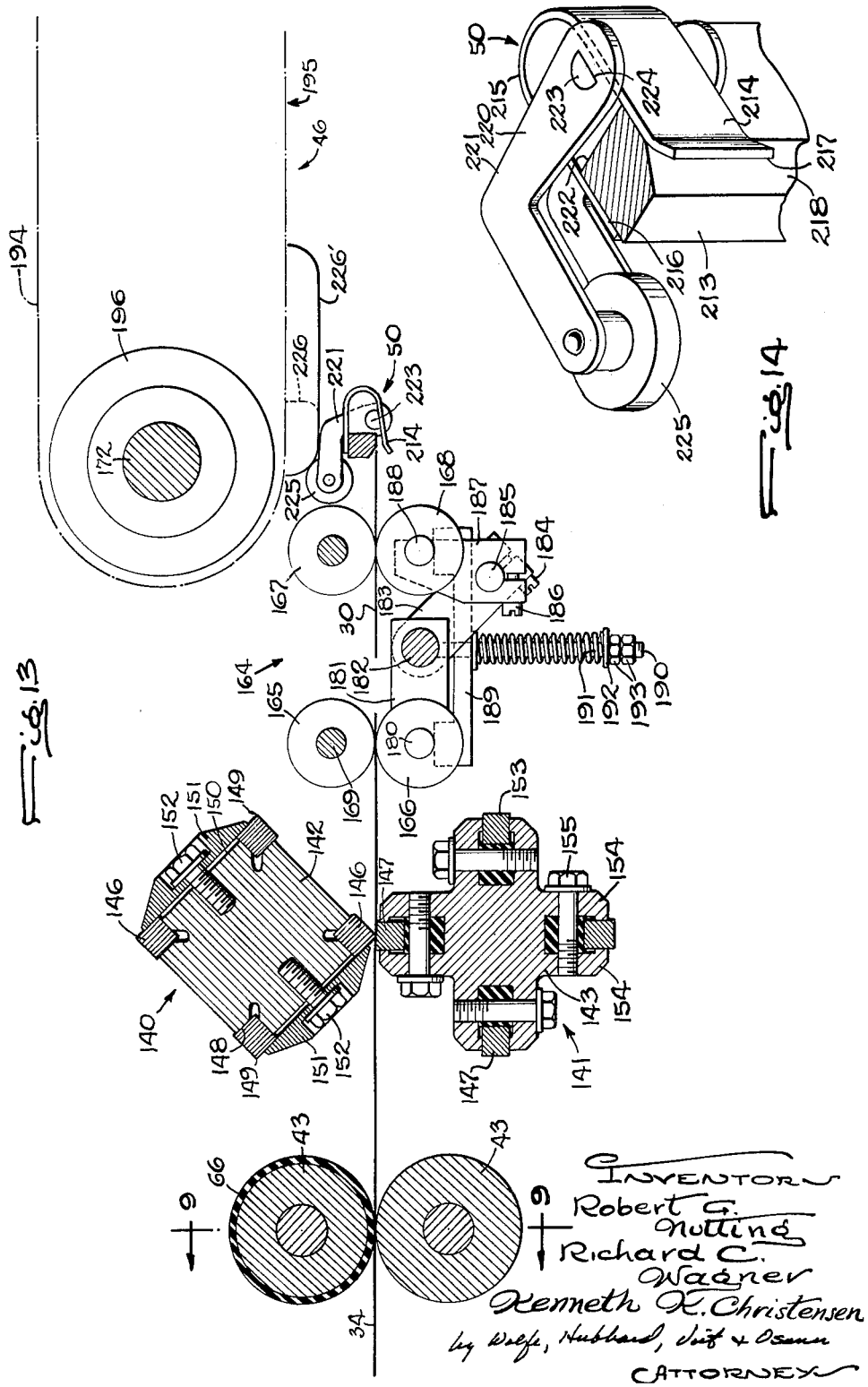

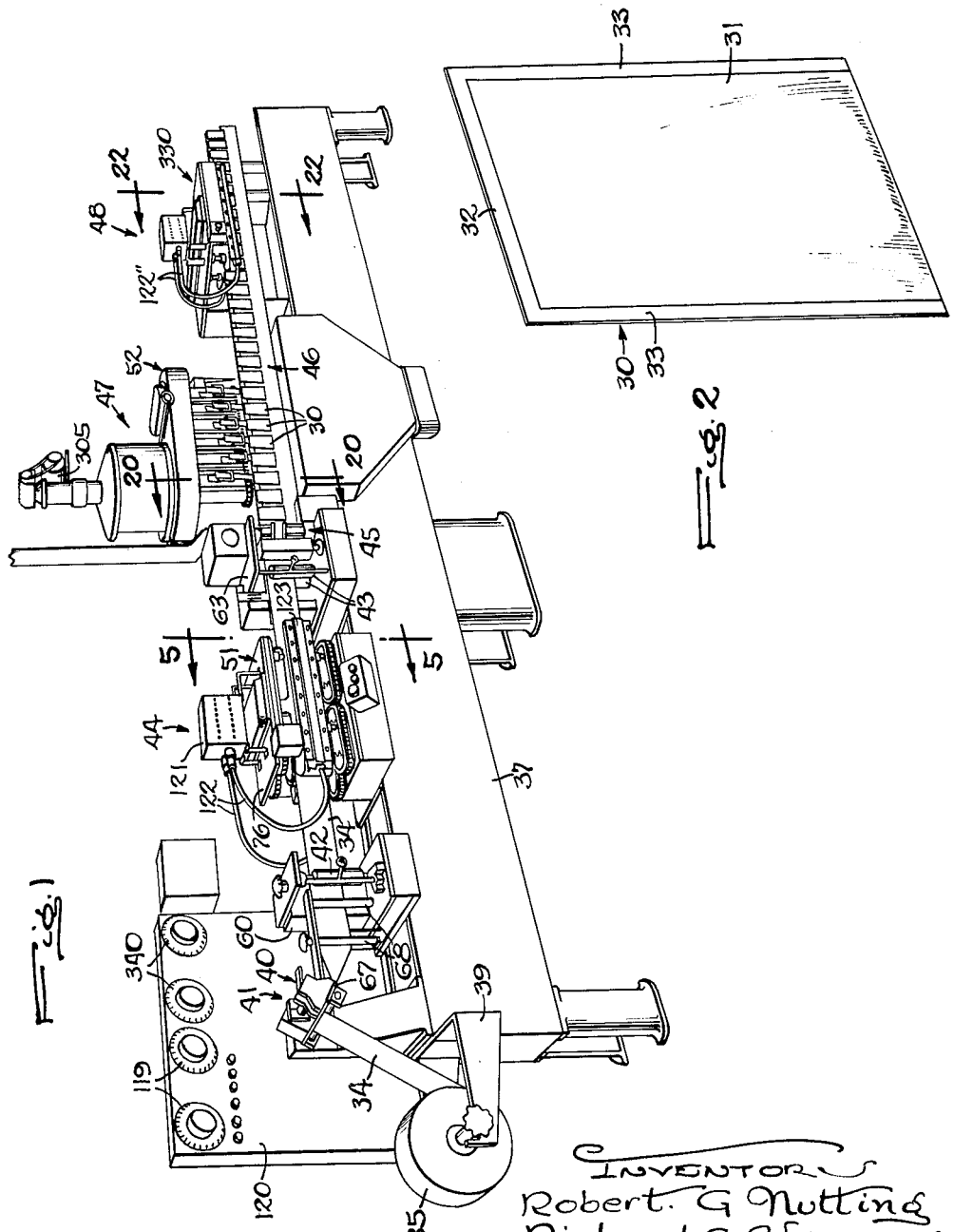

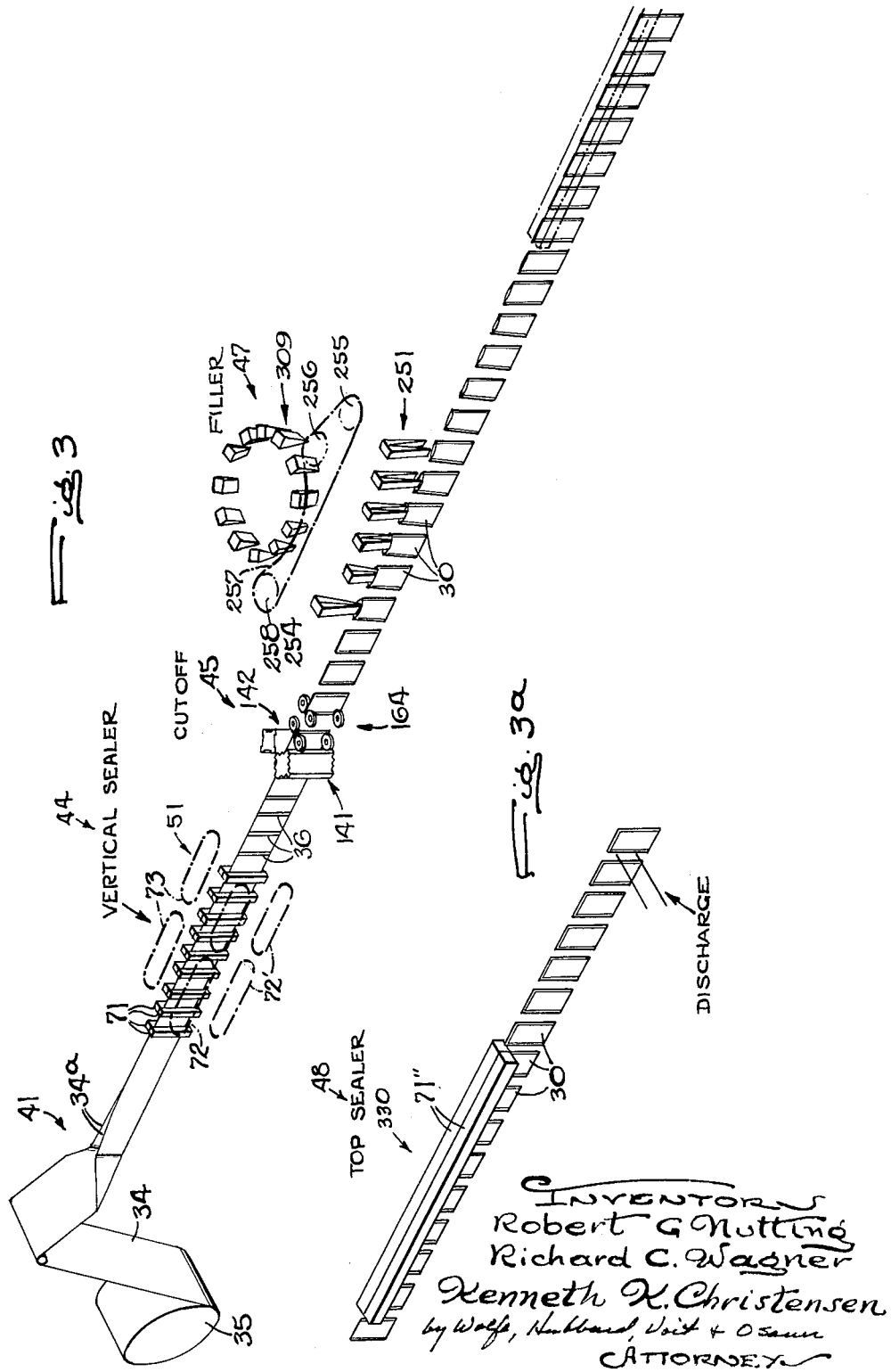

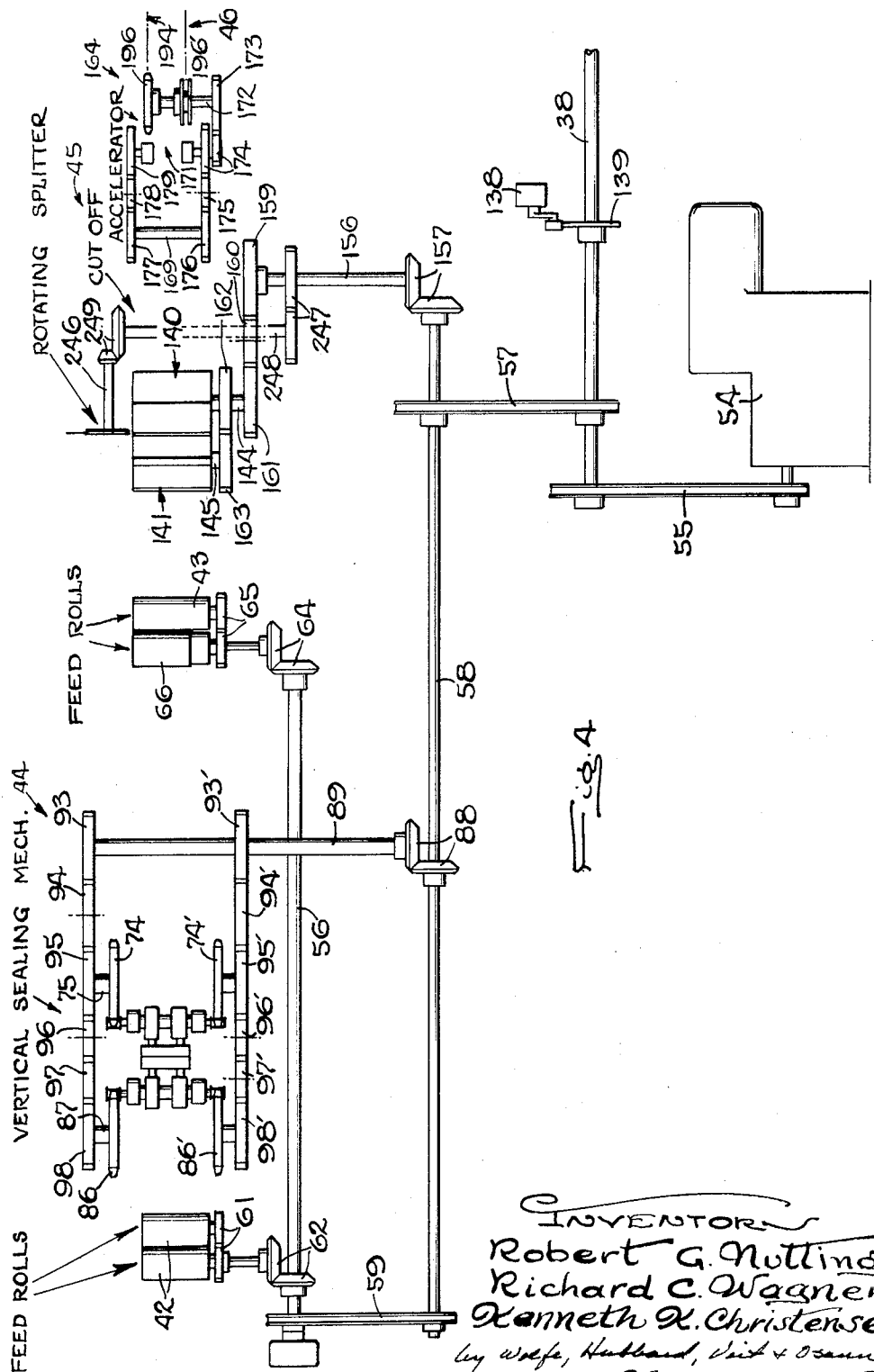

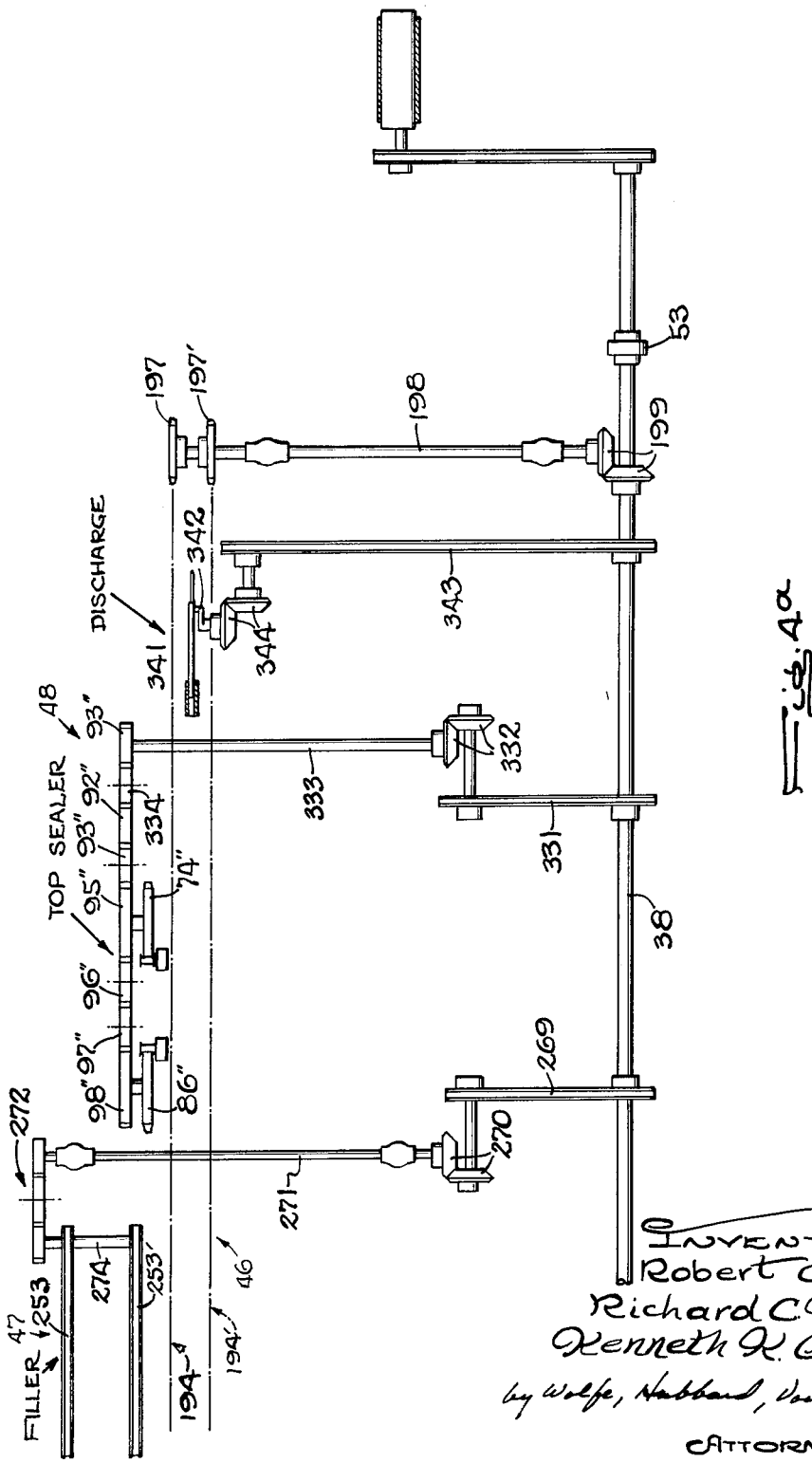

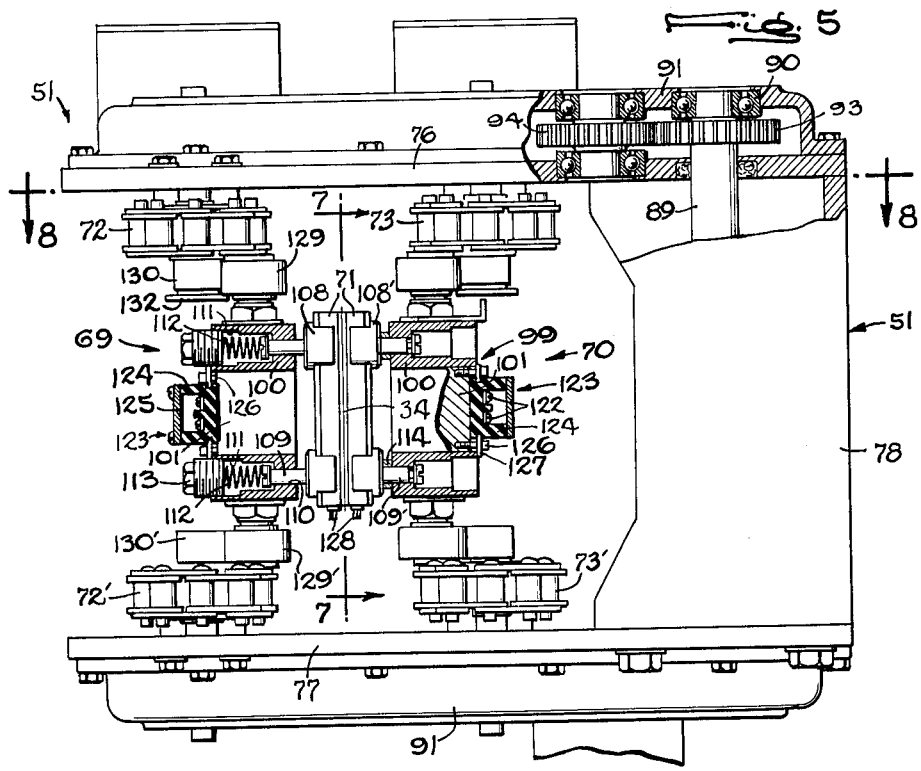
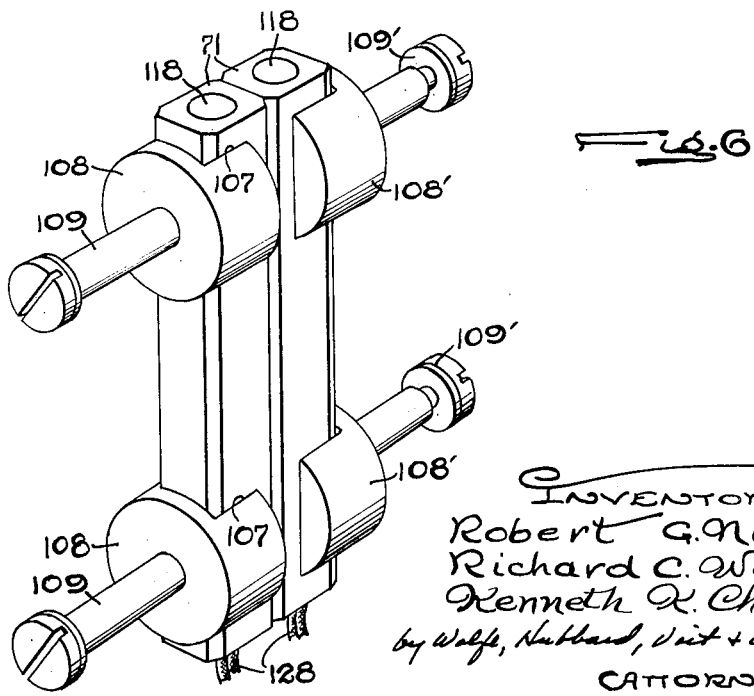

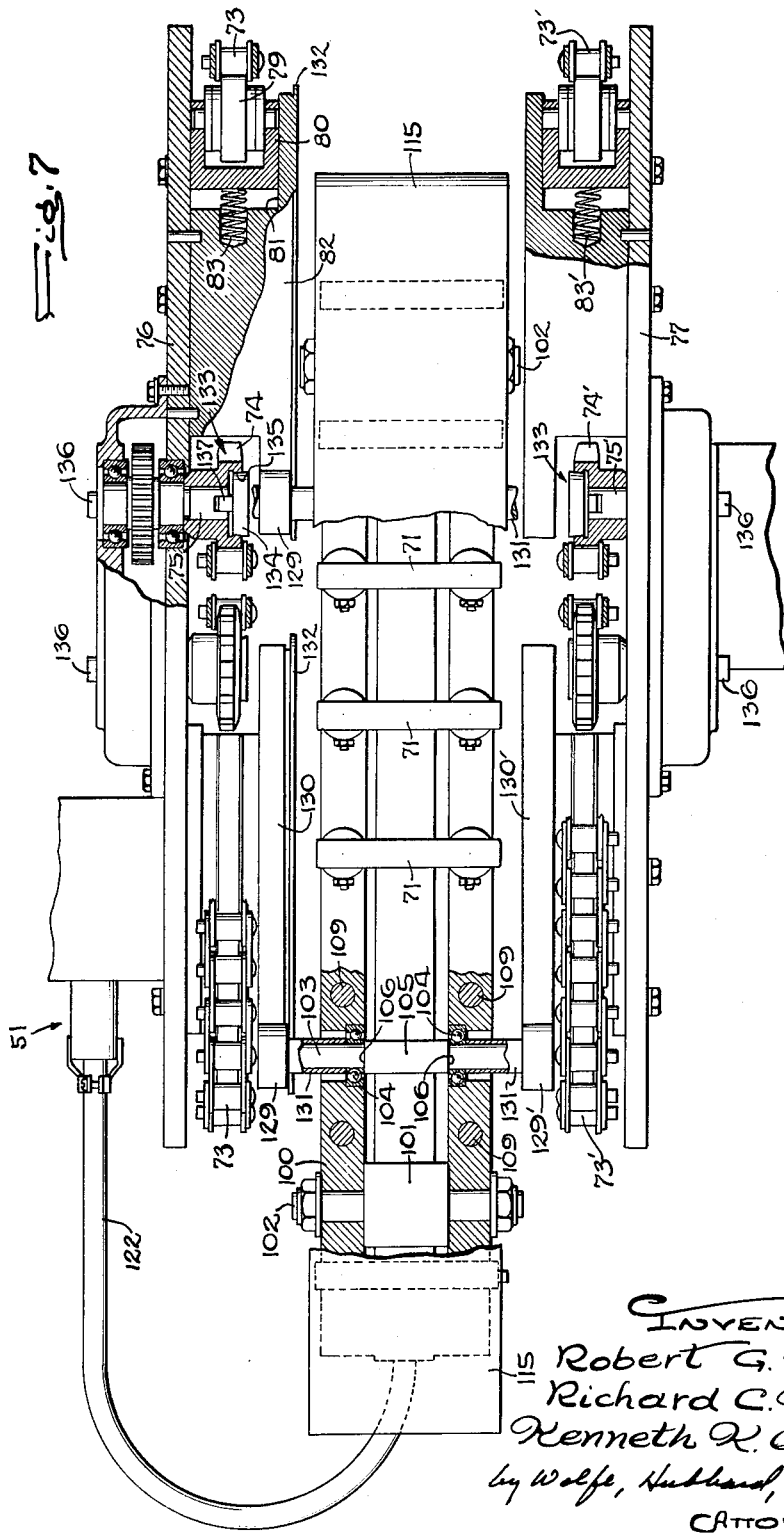

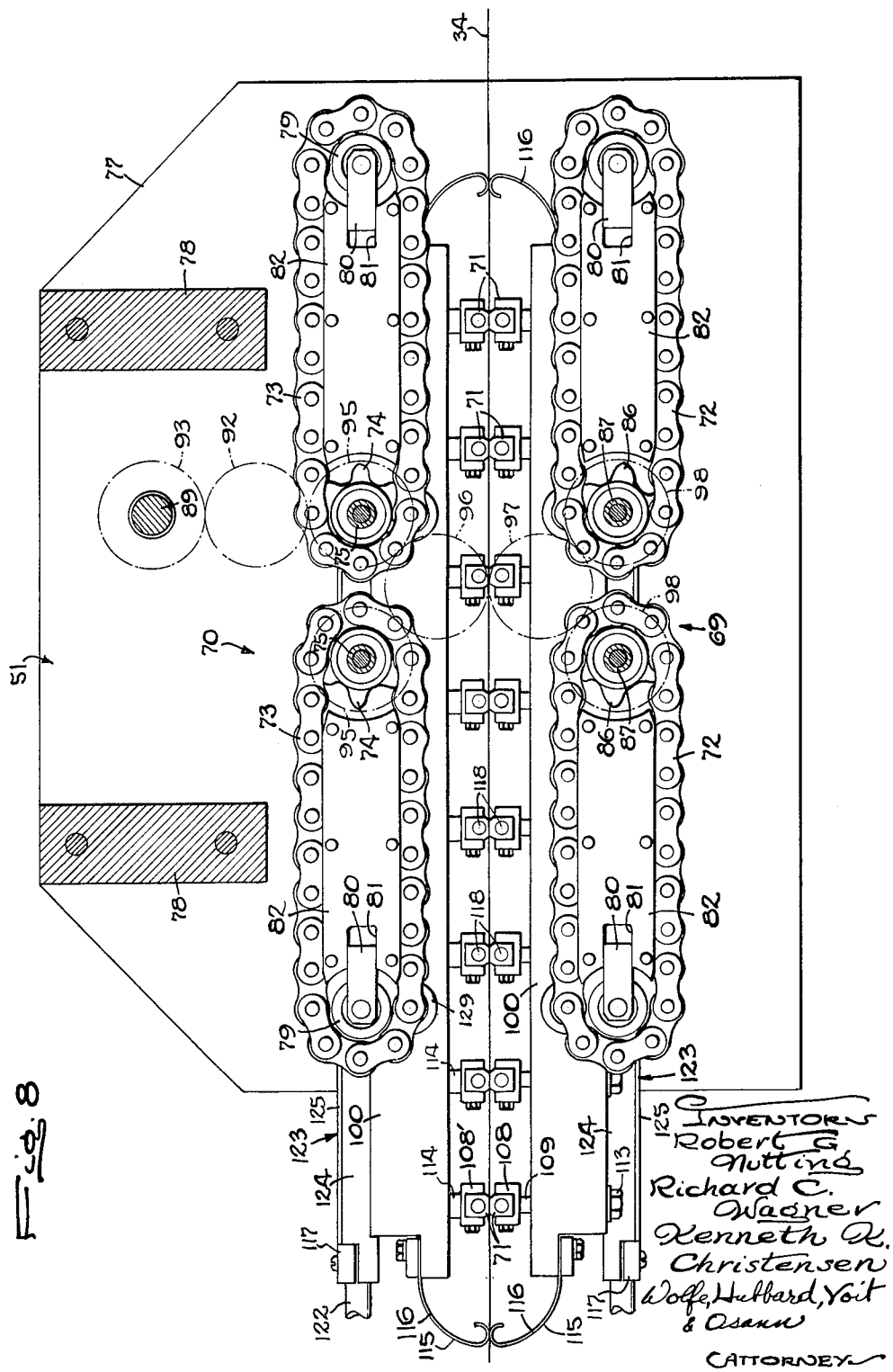

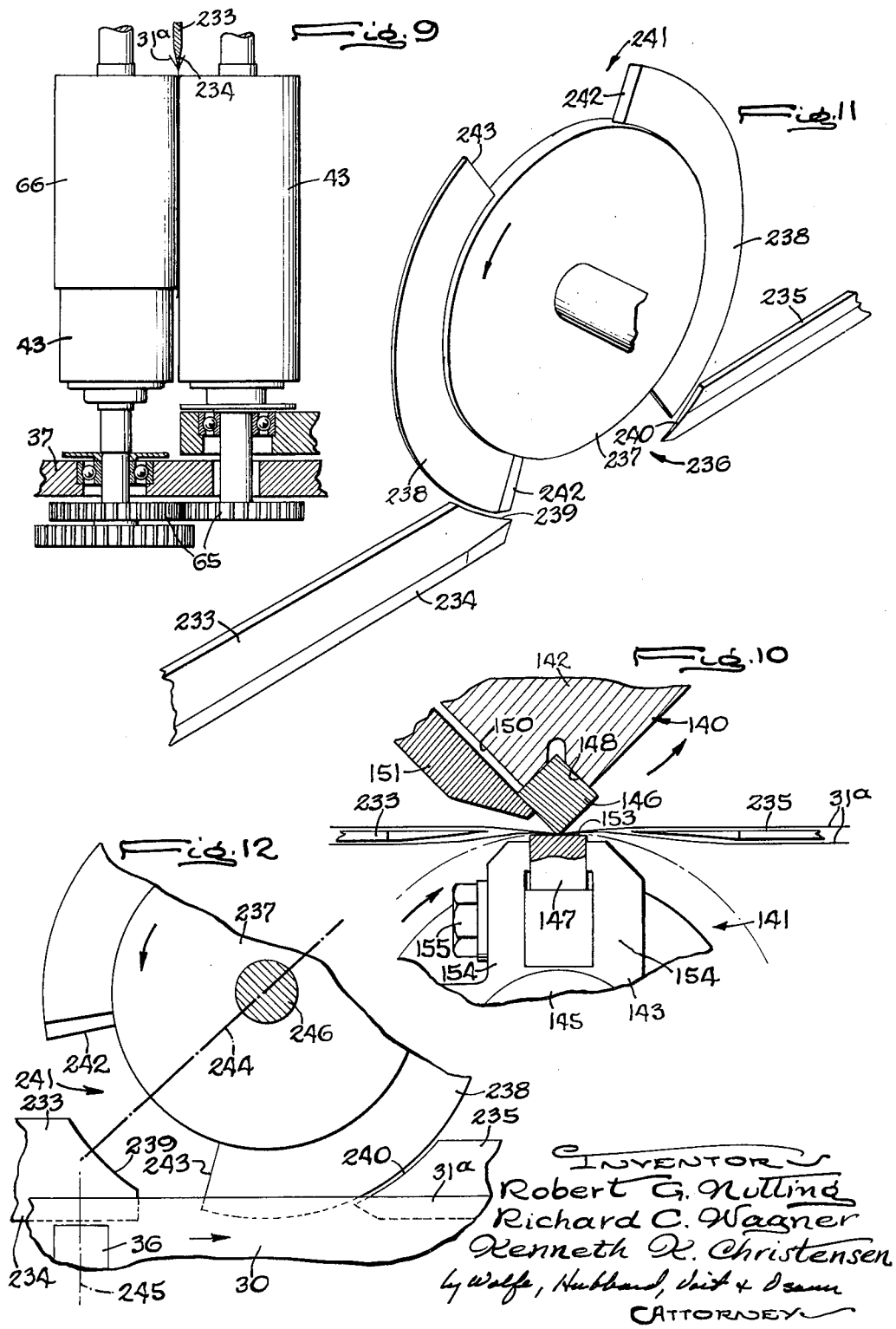

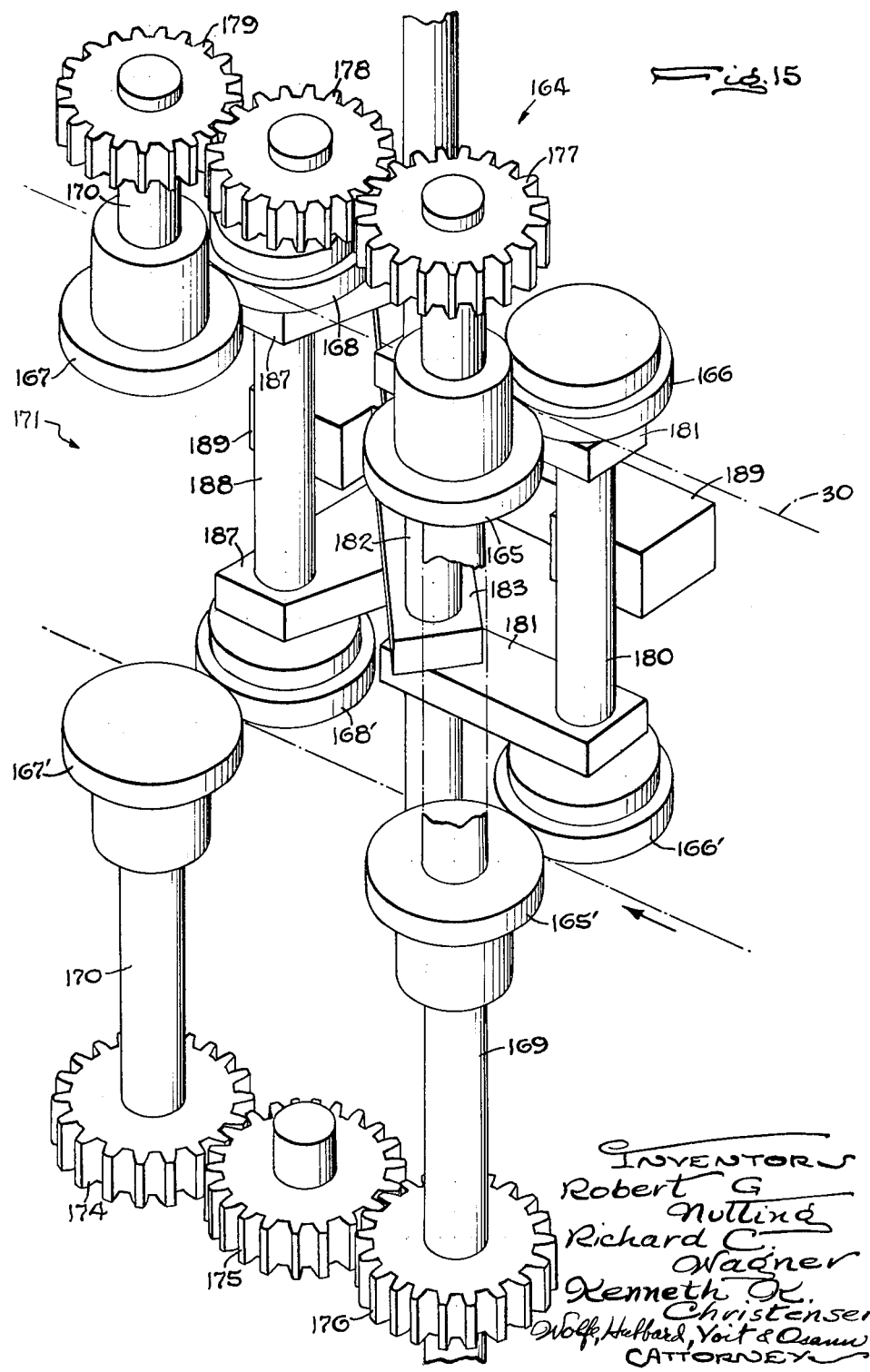

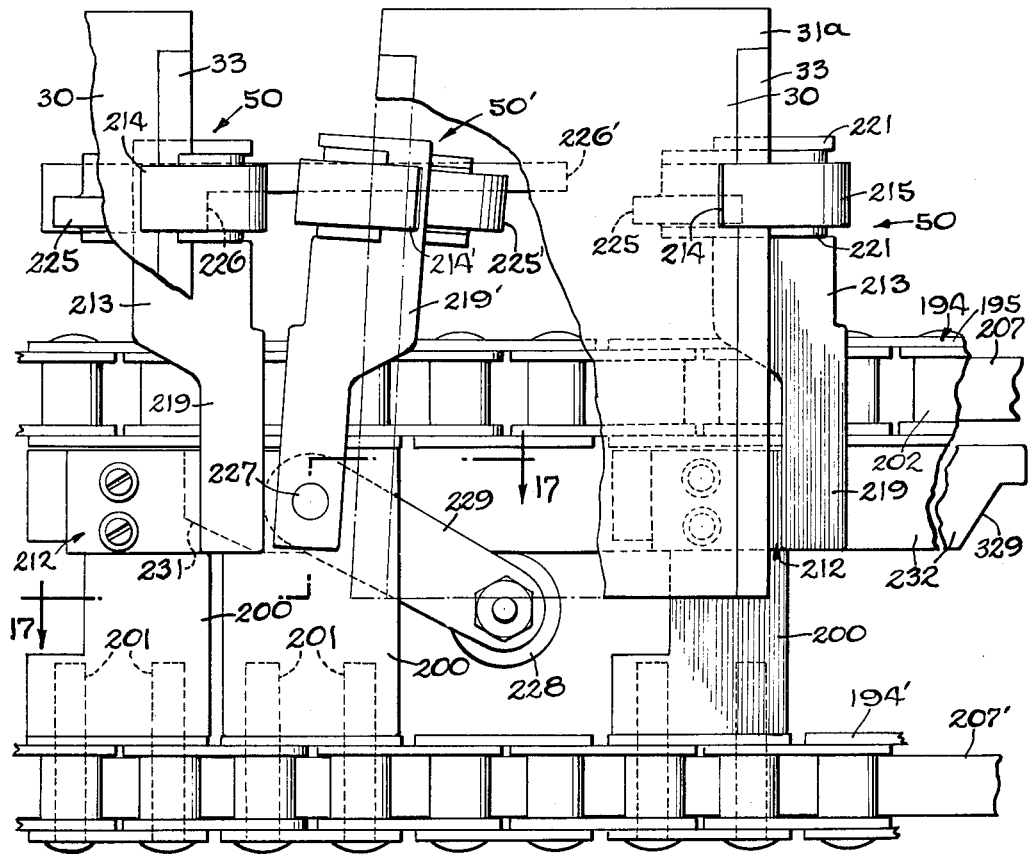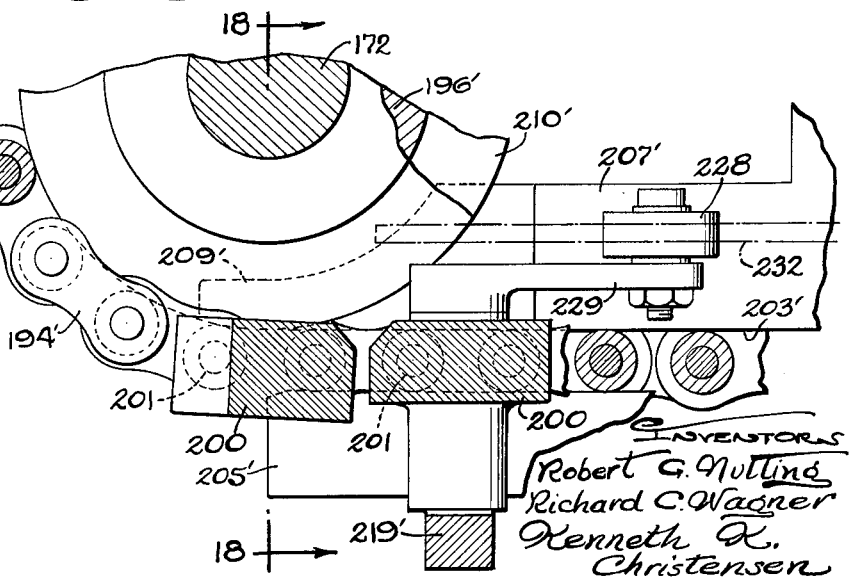

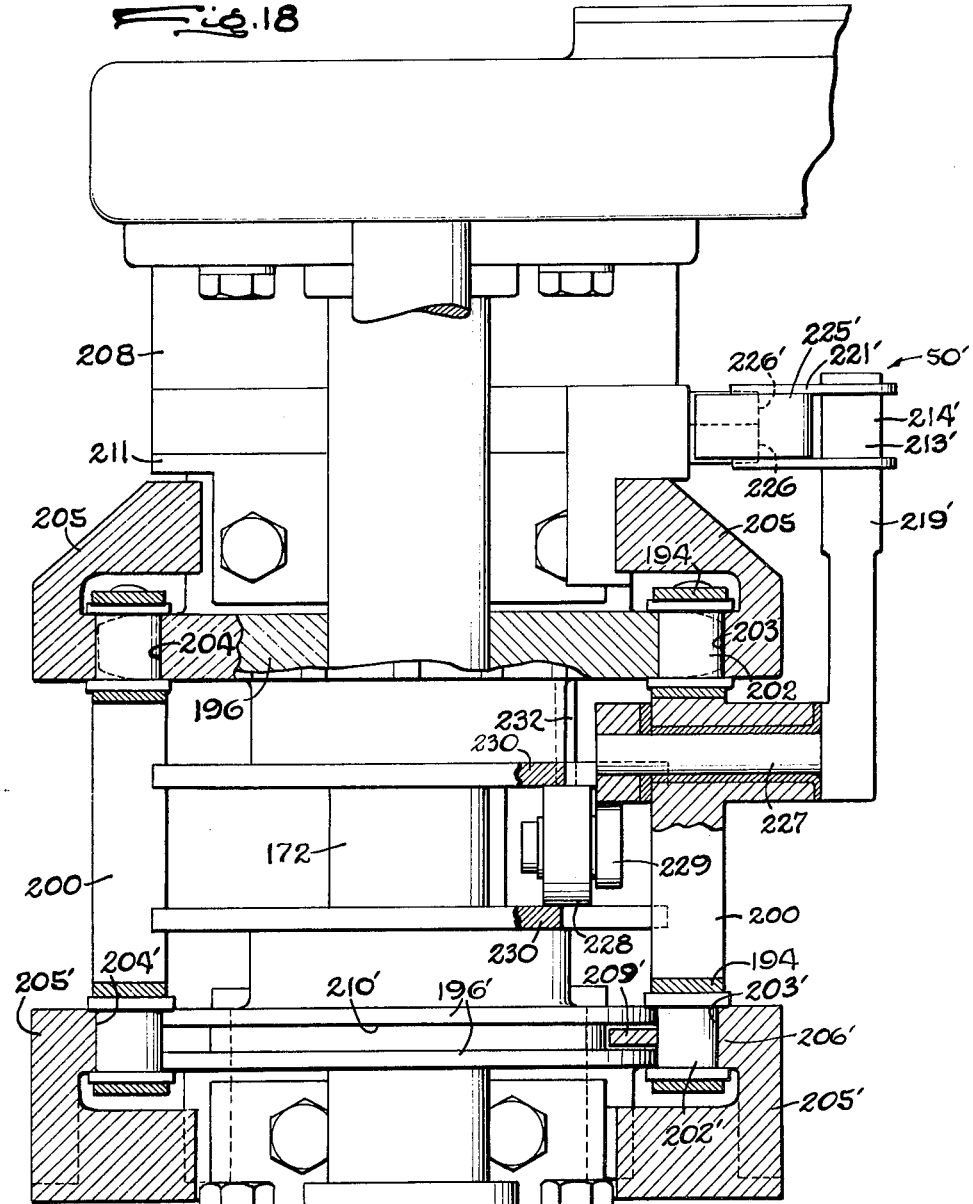

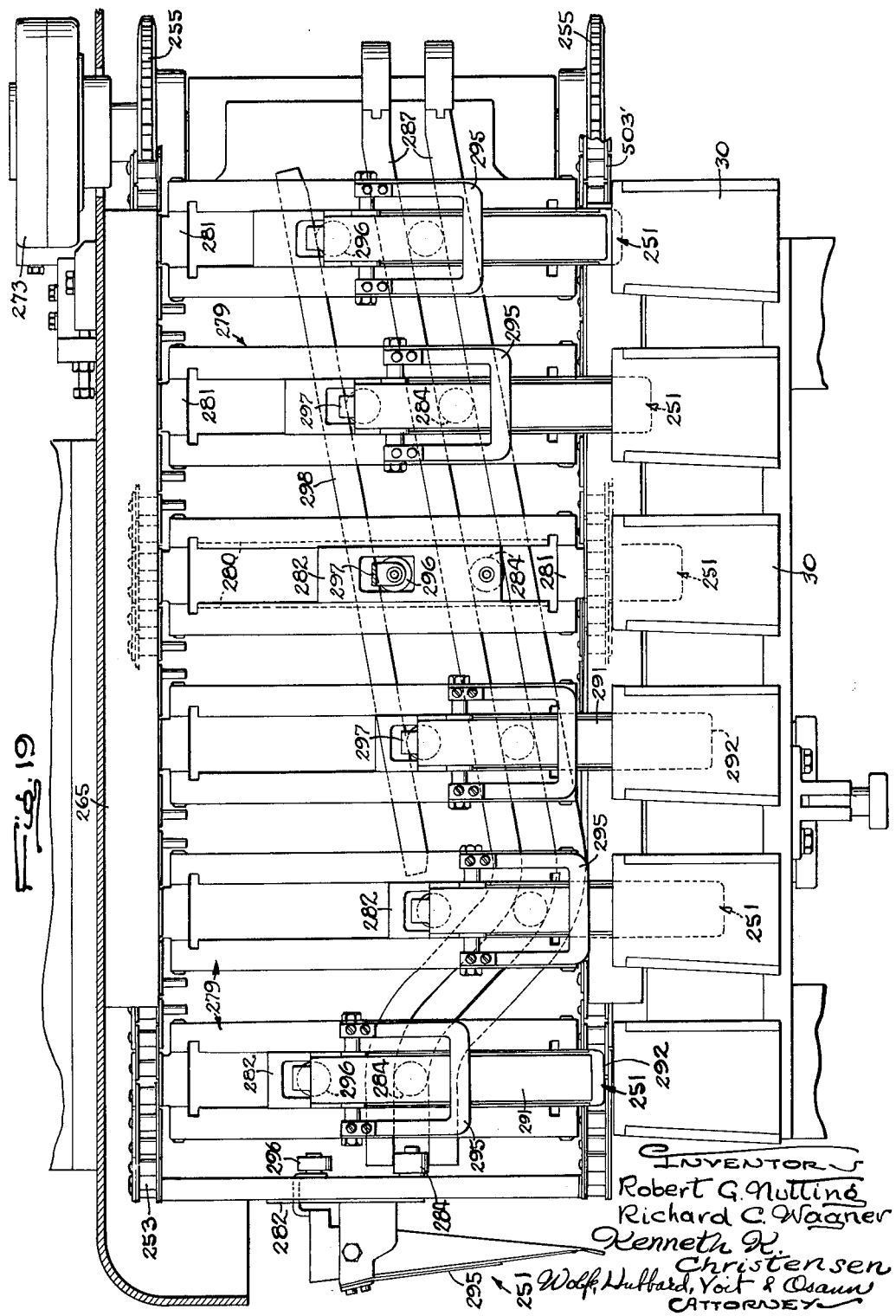

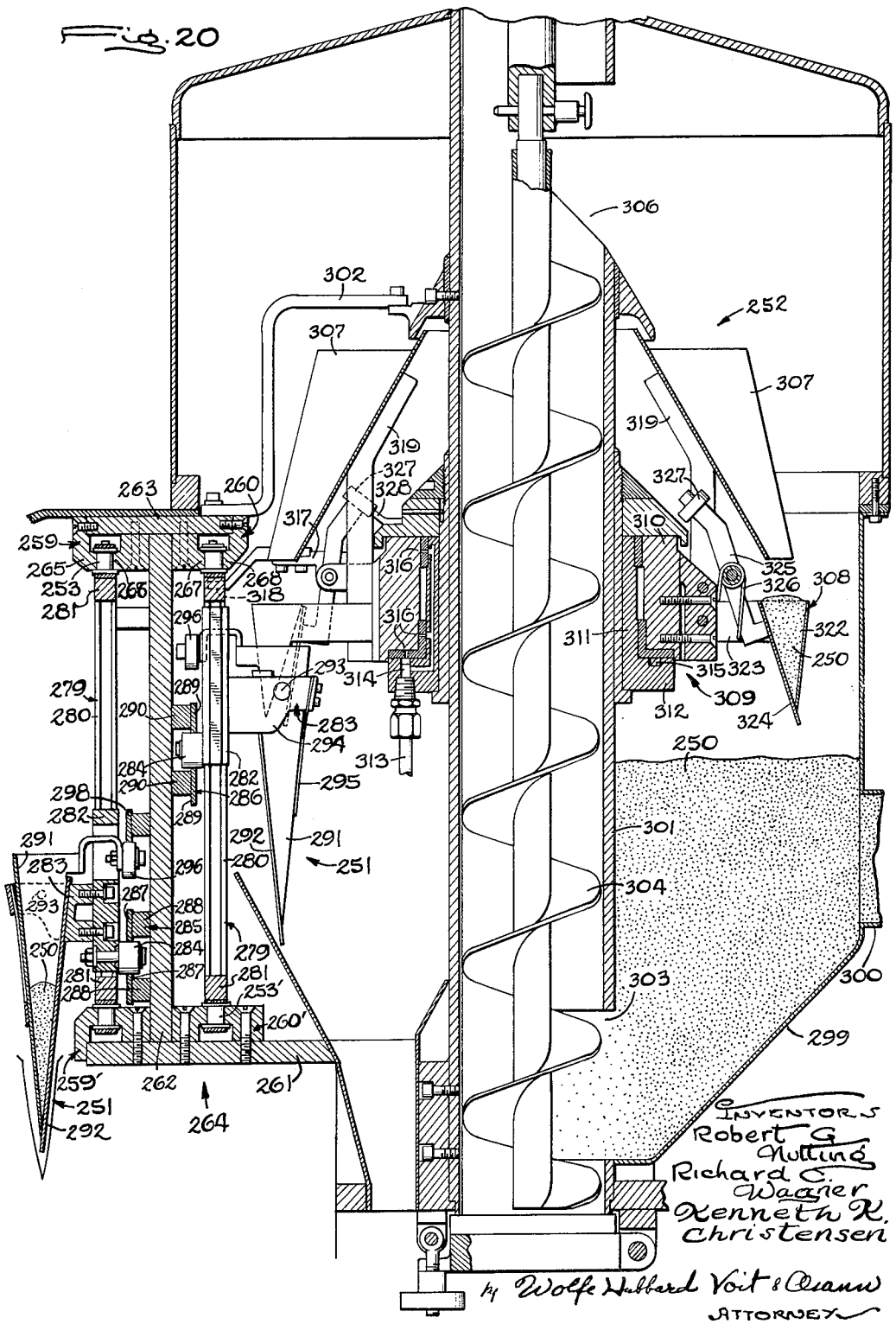

Jan. 25, 1966   R. G. NUTTING ETAL   3,230,687
PACKAGING MACHINE

Filed April 10, 1961   16 Sheets-Sheet 15

INVENTORS
Robert G. Nutting
Richard C. Wagner
Kenneth A. Christensen
Wolfe Hubbard Voit & Osann
ATTORNEYS Jan. 25, 1966     R. G. NUTTING ETAL     3,230,687
PACKAGING MACHINE Filed April 10, 1961                16 Sheets-Sheet 16

INVENTORS
Robert G. Nutting
Richard C. Wagner
Kenneth W. Christensen
by Wolfe, Hubbard, Voit & Osann
ATTORNEYS United States Patent Office 3,230,687
Patented Jan. 25, 1966

3,230,687
PACKAGING MACHINE
Robert G. Nutting, Glenview, Richard C. Wagner, Clarendon Hills, and Kenneth K. Christensen, Lombard, Ill., assignors, by mesne assignments, to Bartelt Engineering Company, Inc., Rockford, Ill., a corporation of Delaware
Filed Apr. 10, 1961, Ser. No. 102,048
4 Claims. (Cl. 53—180)

This invention relates to a machine for forming, filling and closing flexible walled bags and, more particularly, to a machine in which the bags are formed by heat sealing two strips of packaging material transversely to form a series of connected bags and in which the bags are severed and advanced by a carrier through closing and filling stations.

One object of the invention is to provide in a machine of the above character a novel sealing mechanism which permits the bags to be made while the strips move with a continuous motion and at a high rate of speed and which, nevertheless, forms the seals accurately and neatly.

A more detailed object is to impart an orbital motion to the sealing mechanism so that the latter moves with the strips to form the seals and then away from the strips.

The invention also resides in the provision of a novel mechanism for cutting the seals intermediate their edges to sever the end bags on the strips.

Other objects and advantages of the invention will become apparent from the following detailed description taken in connection with the accompanying drawings, in which FIGURE 1 is a perspective view of a packaging machine embodying the novel features of the present invention.

FIG. 2 is an enlarged perspective view of a package made on the machine.

FIG. 3 is a schematic perspective view illustrating the steps performed on the machine.

FIG. 3a is a schematic perspective view forming a continuation of the right-hand side of FIG. 3.

FIG. 4 is a schematic view illustrating the drive to the various mechanisms.

FIG. 4a is a schematic view forming a continuation of the right-hand side of FIG. 4.

FIG. 5 is an enlarged sectional view taken along the line 5—5 in FIG. 1, parts being broken away and shown in section.

FIG. 6 is an enlarged perspective view of the heat sealing bars.

FIG. 7 is a sectional view taken along the line 7—7 in FIG. 5, parts being broken away and shown in section.

FIG. 8 is a sectional view taken along the line 8—8 in FIG. 5.

FIG. 9 is an enlarged fragmentary sectional view taken along the line 9—9 in FIG. 13.

FIG. 10 is an enlarged fragmentary plan view of the mechanism for cutting the bags from the strips.

FIG. 11 is a fragmentary perspective view of the mechanism used for guiding the bags.

FIG. 12 is a fragmentary plan view of the parts shown in FIG. 11 but with the parts in a different position.

FIG. 13 is a diagrammatic plan view of the mechanisms for severing the bags and transferring the bags to the carrier.

FIG. 14 is an enlarged fragmentary perspective view of one of the clamps used to hold a bag on the carrier.

FIG. 15 is a perspective view of the mechanism for delivering the severed bags to the carrier.

FIG. 16 is a fragmentary front elevational view of the forward end of the carrier, parts being broken away and shown in section.

FIG. 17 is a fragmentary sectional view taken along the line 17—17 in FIG. 16.

FIG. 18 is a fragmentary sectional view taken along the line 18—18 in FIG. 16.

FIG. 19 is a fragmentary front elevational view of the filling mechanism, parts being broken away and shown in section.

FIG. 20 is an enlarged fragmentary sectional view taken along the line 20—20 in FIG. 1.

Figure 21:
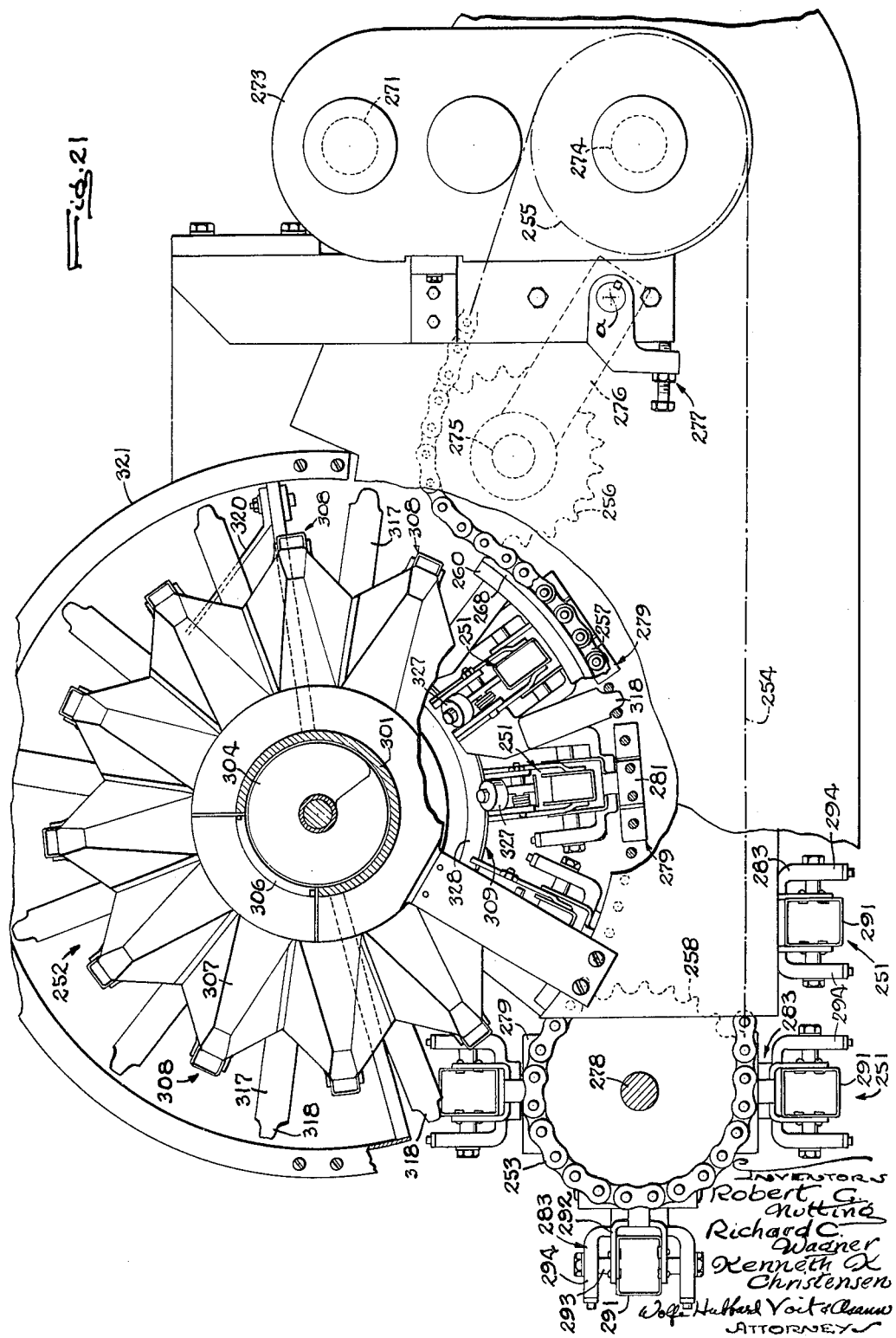
FIG. 21 is an enlarged fragmentary plan view of the filling mechanism, parts being broken away and shown in section.

As shown in the drawings for purposes of illustration, the invention is embodied in a machine for forming, filling and closing a pouch or bag 30 which is composed of two rectangular panels 31 disposed face to face and joined together at their margins preferably by a fold at the bottom and heat seals 32 and 33 at the top and sides respectively. Herein, the bags are made from a web 34 of sheet material either composed of or coated on one side with a thermoplastic material and drawn off a supply roll 35. The web is folded longitudinally (see FIGS. 3 and 3a) and the two resulting strips 34ᵃ are heat sealed together transversely at spaced intervals as indicated at 36 to form a series of connected bags. The latter then are separated by cutting the seals 36 intermediate their edges so that each seal forms the trailing side seal 33 of one bag and the leading side seal of the next bag. After being separated from the web 34, each bag is filled with the product to be packaged and then is closed by the top seal 32.

The various mechanisms for advancing, folding and cutting the web 34 and for advancing, filling and closing the bags 30 are mounted on an elongated, horizontal base 37 and are operated in timed relation to each other by a horizontal shaft 38 (FIGS. 4 and 4a) journaled in and extending lengthwise of the base. The supply roll 35 is supported on the end of the machine base 37 by a bracket 39 and the web 34 is drawn off the roll and over a plow 40 which is located at a station 41 and which folds the web longitudinally, the web being advanced in this case by two sets of feed rollers 42 and 43 spaced along the base (FIGS. 1 and 4). From the folding station, the web is advanced to a station 44 where the cross seals 36 are formed and then to a cut-off station 45 where the successive end bags are severed from the web. After being cut from the web, the bags are carried edgewise by a conveyor 46 which carries the bags first through a filling station 47 and then through a top sealing station 48. As shown in FIG. 16, the conveyor may take the form of an endless chain 194 one run of which forms an extension of the path of the web 34 and the bags are supported in spaced relation on this run by grippers or clamps 50.

According to the present invention, the various mechanisms for forming, filling and closing the bags 30 are constructed and correlated with each other in a novel manner so that the web 34 and the bags on the conveyor 46 may move continuously and at a comparatively high speed to produce a large number of completed packages per minute while maintaining the accuracy of the fill and the overall neatness of the packages. To these ends, the mechanisms are constructed so that they may perform their individual functions in periods larger than in prior machines of this type and yet still produce packages at a higher rate.

In general, the high rate of production is achieved while the accuracy and neatness of the package is maintained by arranging the operating mechanisms to move with the web 34 and the bags 30 as they are performing their packaging functions but to operate with the same precision and ruggedness as the corresponding mechanisms of appreciably slower machines heretofore employed. Thus, the mechanism 51 for forming the cross seals 36 firmly engages the web without stretching or wrinkling the latter to make strong, neat and accurately spaced seals. Similarly, the bags are positively held open preparatory to filling, the air in the bag is displaced first by the filling mechanism 52 rather than by the product and the bags are filled from the bottom, all this being accomplished over a comparatively long period in spite of the high speed production of the machine. Also, the top seals 32, like the side seals 33, are made precisely to maintain the attractive appearance of the bag.

In the present instance, the shaft 38 (FIG. 4) for driving the operating mechanisms is journaled in bearings 53 and is rotated continuously by a motor 54 through speed reducing chain drive 55. Both sets of feed rolls 42 and 43 are driven in unison from a common shaft 56 which is journaled on the base 37 parallel to the drive shaft 38 and driven, in turn, by the latter through a chain 57, an intermediate shaft 58 and a chain 59. The feed rolls 42 are rotatably supported on opposite sides of the web 34 by a bracket 60 (FIG. 1) which is mounted on the base 37 in advance of the sealing station 44. Meshing gears 61 (FIG. 4) fast on the rolls drive the latter together but in opposite directions and are driven from the shaft 56 through bevel gears 62. Similarly, the feed rolls 43, which are journaled in a bracket 63 on the opposite side of the sealing station, are driven from the shaft 56 through bevel gears 64 and meshing gears 64 on the lower ends of the rolls. One roll of the set 43 has a rubber covering 66 which stops short of the fold line of the web and prevents excessive creasing. The rolls 42 and 43 draw the web 34 from the supply roll 35 and across the plow 40 which may be of well-known construction and comprises a stationary triangular plate 67 supported on the base 37 and inclined downwardly, the web being folded around the plate by upright idler rollers 68.

In order that the operating parts of the sealing mechanism 51 may move with the web 34 to provide a sufficient period for heat sealing the web and still form neat seals 36 without stretching or wrinkling, this mechanism includes two units 69 and 70 each of which carries a plurality of sealing bars 71 (see FIGS. 5 and 8) opposing the bars on the other unit and the two units are given an orbital movement. Thus, the units move together and into engagement with opposite sides of the web and then move along with the web at the same speed at which the latter is advancing. During the period in which the sealing units 69 and 70 are traveling with the web, the bars 71 form a plurality of cross seals 36 and then the units are backed away from the web. The orbital path is completed by the units moving back in a direction opposite to the web advance. In this way, the bars 71 may be supported firmly on the units against twisting and yet may be individually yieldable to produce the optimum pressure for making the seals 36.

To give each of the sealing units 69 and 70 the desired orbital motion, each unit is supported and moved by carriers herein in the form of endless chains disposed above and below the unit. Thus, as shown in FIGS. 5, 7 and 8, the front sealing unit 69 is connected to a pair of endless chains 72 above the unit and a similar pair of chains 72' below (see FIG. 3). In the same manner an upper pair of chains 73 and a lower pair 73' (FIG. 7) support the rear sealing unit 70, the construction for the two units being substantially the same. Thus, the upper chains 73 are disposed end to end and the adjacent ends are driven by sprocket wheels 74 (FIG. 4) whose shafts 75 are journaled in a horizontal stationary plate 76 (FIG. 5). The latter is supported on a similar plate 77 which is disposed beneath the sealing units 69 and 70, through the medium of upright posts 78 spanning extensions on the rear of the plates. The posts are bolted to both plates and the lower plate 77 is secured rigidly to the base 37 so that the two plates and the posts form a C-shaped bracket for supporting the sealing units.

The outer ends of the upper chains 73 are guided around rollers 79 which are journaled between the legs of U-shaped supports 80 (FIGS. 7 and 8) which slide laterally in slots 81 cut in the ends of blocks 82 depending from the upper plate 76. The supports 80 are urged outwardly by compression springs 83 to maintain the chains 73 under the desired tension. The similar pair of chains 72 supporting the upper end of the front sealing unit 69 are driven by sprocket wheels 86 fast on shafts 87 (FIG. 4).

Also, these chains extend around rollers journaled in supports which slide in blocks and are urged outwardly by compression springs, these parts being the same as used in connection with the chains 73. The lower chains 73' for the sealing unit 70 and the chains 72' for the unit 69 are substantial duplicates of the upper chains and the corresponding parts are indicated by the same but primed reference characters.

All of the chains for both sealing units 69 and 70 are driven in unison from the drive shaft 58 through bevel gears 88 (FIG. 4) and an upright shaft 89 which spans the plates 76 and 77 and is journaled in bearings 90 (FIG. 5) in gear housings 91 bolted to the plates. A gear 93 (FIGS. 4, 5 and 8) keyed to the upper end of the shaft 89 drives a gear 94 meshing with one of the gears 95 on the rear sprocket wheel shafts 75. The gear 96 meshing with both of the gears 95 completes the drive to these two shafts and also drives the front chains 72 through an idler gear 97 and gears 98 on the front sprocket wheel shafts 86. A similar gear train drives the lower chains as indicated by the primed reference characters in FIG. 4.

Each of the sealing units 69 and 70 includes a rigid supporting portion 99 which is mounted on the associated chains at widely spaced points to provide a stable mounting for the sealing bars 71 while permitting the latter to be individually yieldable. As shown in FIGS. 5 and 7, this support 99 for the unit 70 is formed by two elongated bars 100 which extend horizontally one above the other lengthwise of the sealing unit, that is, parallel to the path of the web 34. The two bars are held apart by spacers 101 which are clamped rigidly between the bars by bolts 102. The support 99 is connected to alined links of one of the sets of chains 73 and 73' by a vertical pin 103 (FIG. 7) which is pinned to these links and journaled in bearings 104 in the bars 100. An enlarged central section 105 of the pin provides shoulders 106 which abut the bearings 104 and prevent the support 99 from moving relative to the pin. A similar pin mounts the support on the other set of chains 73 and 73' and, in the same manner, the support 99 of the front unit 69 is mounted on the chains 72 and 72'. With the foregoing arrangement, the sealing bar supports 99 remain precisely parallel to the path of the web 34 while they follow their orbital paths.

The sealing bars 71 on the front unit 69 are received and secured in vertical slots 107 cut in spaced blocks 108 (FIGS. 5 and 6) which are carried on the ends of horizontal screws 109. The latter slide in holes 110 in the inner sides of the bars 100. The holes open into enlarged bores 111 which house compression springs 112 acting between heads on the screws 109 and plugs 113. The latter are threaded into the outer ends of the bores to adjust the compression of the springs and hence the force with which the sealing bars 71 are urged outwardly.

While the sealing bars 71 on the rear unit 70 may also be supported yieldably as are the bars on the front unit 69, it is preferred to mount these rigidly. For this purpose, the bars are received in blocks 108' similar to the blocks 108 and these blocks are carried by screws 109' which, like the screws 109, project into holes 110 in the bars 100 of the unit 70. In this case, however, spacers 114 surround the screws between the blocks 108' and the bars 100 and the screws are tightened to clamp the blocks rigidly against the spacers.

In the present instance, the support 99 of each sealing unit 69 and 70 carries eight sealing bars 71 and the bars on one unit directly oppose the bars on the other. Thus, eight cross seals 36 are made each time the two sealing units come together. Preferably, the bars do not act directly on the web 34, but instead, act through a sheet 115 (FIGS. 7 and 8) of a material which is heat resistant but which transmits heat and does not stick to the web. A suitable material for this purpose is sold under the trade name Teflon by E. I. du Pont de Nemours. One such sheet is used with each sealing unit and extends throughout the length of the unit across the sealing faces of the bars 71. The ends of the sheet 115 are bent back around curved guides 116 carried by the support 99 and clamped between jaws 117 on the bars 100. Embedded in each sealing bar 71 is an electric heating coil 118 (FIG. 6) which maintains the bar at the proper temperature for forming the heat seals 36.

In addition to the advantages of the sealing mechanism 51 as enumerated previously, this mechanism also permits the heating coils 118 to be connected to power lines easily and without the use of commutator rings. Thus, power from a suitable source is connected through rheostats 119 (FIG. 1) in a control panel 120 and then to a signal box 121 mounted on the plate 76. From the box, flexible leads 122 extend to the ends of each sealing unit 69 and 70 and then through a conduit 123 on the associated support 99. Each conduit is formed from a channel 124 (FIG. 5) extending along the outside of the support between the bars 100 and a cover 125. The channel is held is place by screws 126 threaded into the spacers 101 and by washers 127 abutting the bars 100 and projecting into slots in the channel. The individual heating coils 118 are connected to the leads 122 by wires 128 extending through the support 99 to the conduit 123.

To provide a backing for the sealing units 69 and 70 as the latter are pressed against the webs 34 and thereby increase the rigidity of the mounting of the sealing bars 71, rollers 129 and 129' (FIGS. 5 and 7) are journaled on the upper and lower end portions of the pins 103 and ride along stationary guides 130 and 130' which are supported on the plates 76 and 77 through the medium of the blocks 82. The rollers 129 and 129' are held in position by sleeves 131 which encircle the pins 103 and abut against the bearings 104 so that the chains 73 and 73' (or 85 and 85'), the rollers 129 and 129' and the support 99 are vertically rigid relative to each other. To prevent the chains from sagging, flanges 132 project laterally from the lower ends of the upper guides 130 and the ends of the upper rollers 129 ride on these flanges.

In order that the sealing bars 71 on one of the units 69 and 70 may initially be alined with the bars on the other unit, the shafts 75 and 87 are connected to their respective sprocket wheels 74 and 86 through identical manual clutches 133 (FIG. 7). The clutch for the sprocket wheel 74, for example, includes a cylinder 134 received in a mating counterbore 135 in the sprocket wheel 74 and drawn up into the counterbore by a bolt 136 projecting through the shaft 75. On the upper side of the cylinder is a squared lug 137 which is received in a complementary notch in the end of the shaft which has a running fit with the sprocket wheel. When the cylinder is drawn tight in the counterbore, the cylinder is connected to the shaft through the lug and frictionally drives the sprocket wheel. By loosening the bolt 136, the sprocket wheel is disconnected from the drive and the chain 73 may be moved by hand to its proper position relative to the other parts.

With the sealing mechanism 51 constructed as described above, the machine may easily be arranged so that it always stops with the sealing bars 71 withdrawn from the web. Thus, there is no danger that the web will be overheated from prolonged contact by the sealing units 69 and 70 when the machine is standing idle. For this purpose, the motor 54 is controlled through well-known circuitry by a switch 138 (FIG. 4) actuated by a cam 139 on the drive shaft 38. The cam is shaped to actuate the switch only in that portion of the machine cycle in which the sealing units are withdrawn and the control of the motor 54 is arranged so that it cannot be stopped until the switch is actuated.

When the cross seals 36 have been made to form a series of connected bags, the latter are advanced by the feed rolls 43 to the cut-off station 45 where the terminal bag is severed from the strip. The cutting is effected by knife units 140 and 141 disposed on opposite sides of the web and operable to cut the web transversely intermediate the edges of each seal 36. As shown in FIGS. 3 and 4, the knife units 140 and 141 comprise upright drums 142 and 143 journaled on the base 37 by means of shafts 144 and 145 (FIG. 4) to turn about their longitudinal axes. The drums are turned continuously from the drive shaft 58 and carry cutter elements 146 and 147 (FIGS. 10 and 13 ) respectively which cooperate with each other to sever the end bag.

Herein, the cutter elements 146 are in the form of elongated bars made of hardened steel and having square cross sections to be received in V-shaped grooves 148 cut lengthwise in the periphery of the drum 142. Preferably, there are four such bars and, when they are positioned in the grooves 148, one corner 149 projects radially outwardly of the drum and serves as a knife edge. To hold the bars in place in the grooves, two flat surfaces 150 are formed on opposite sides of the drum 142, these surfaces extending from one groove to the next groove and being generally alined with the exposed sides of the bars 146, and plates 151 are clamped to the flat surfaces 150 by means of bolts 152 to abut against the bar sides. In this way the bars are held securely on the drum 142 but may easily be removed and turned to expose a different corner when the corner being used becomes dull.

In the case of the knife unit 141, the cutter elements 147 also are bars identical to the bars 146 but are held with a flat side 153 tangentially disposed relative to the drum 143. Thus, the sides 153 serve as anvils for the knife edges 149 so that a knife edge and an anvil cooperate to make each cut (see FIG. 10). Each bar 147 is held between two parallel, yieldable jaws 154 which project outwardly from the drum 143 and are drawn together by bolts 155 which project through one jaw and are threaded into the other. By making the bars 147 the same as the bars 146, the two sets may be interchanged after all four corners of each of the bars 146 have dulled so that the bars 147 then provide the knife edges while the bars 146 serve as the anvils. In this way, the eight bars originally installed on the machine provide thirty-two knife edges or eight complete changes without replacement.

To drive the drums 142 and 143, a vertical shaft 156 (FIG. 4) is journaled on the base 37 and is driven from the drive shaft 58 through bevel gearing 157. A gear 159 keyed to the upper end of the shaft 156 meshes with an idler gear 160 which, in turn, meshes with a gear 161 on the lower end of shaft 144 of the drum 142. A second gear 162 keyed to this shaft meshes with a gear 163 equal in size and keyed to the shaft 145 of the drum 143 so that the two drums are turned in unison but in opposite directions.

Although the bags 30 are edge-to-edge when attached to the web 34, they are spaced apart when carried by the conveyor 46 so as to permit more accurate and neater filling and closing operations. To effect such spacing, the conveyor is driven at a faster speed than the web. For example, the linear speed of the web may be about 16 inches per second while the conveyor may move at a speed of approximately 22 inches per second. In order that each bag 30 as it is cut from the web is delivered to a clamp 50 (FIG. 14) on the conveyor, it is accelerated and momentarily moves at a speed faster than the conveyor.

To transfer the severed bag 30 from the web 34 to the conveyor 46 and, at the same time, to speed up the rate of travel of the bag, an accelerating mechanism 164 is disposed between the cut-off station 45 and the adjacent end of the conveyor. The accelerator 164 includes a first pair of vertical rollers 165 and 166 (FIG. 13) which receive the leading edge of the end bag on the web just before this bag is cut by the knife units 140 and 141. The timing is such that the rollers 165 and 166, which are turning at a higher peripheral speed than the web advance, slip momentarily as the bag is cut. These rollers then accelerate the bag and deliver it between a second pair of rollers 167 and 168 which are turning at the same speed as the first pair and the second pair of rollers, in turn, delivers the leading edge of the bag to one of the clamps 50 on the conveyor 46. Since the peripheral speed of the rollers 167 and 168 is greater than the linear speed of the conveyor and since the clamp is closed before the bag is released by these rollers, the bag will buckle slightly during the transfer. Such buckling insures that the bag is inserted completely in the clamp and properly positioned for subsequent operations. Preferably, a second complete set of rollers 165', 166', 167' and 168' are disposed below the rollers 165, 166, 167 and 168 so that the bag is engaged at vertically spaced points and kept upright (FIG. 15).

The rollers 165 and 165' are fast on a shaft 169 which is journaled on the base 37 while the rollers 167 and 167' turn with stub shafts 170 projecting toward each other from the top and bottom of the bracket 63 (FIG. 1). This leaves a pocket 171 through which each clamp 50 may pass as it enters the position in which it receives a bag. The rollers 165, 165', 167 and 167' are driven from the shaft 38 through the medium of the conveyor 46 whose shaft 172 (FIG. 4) carries a gear 173 meshing with a gear 174 on the lower stub shaft 170. Through an idler gear 175, the gear 174 drives a gear 176 keyed to the lower end of the shaft 169. A gear 177 keyed to the upper end of that shaft meshes with an idler gear 178 which, in turn, meshes with a gear 179 on the upper stub shaft 170.

The rollers 166 and 166' are urged into frictional engagement with the rollers 165 and 165' to be driven thereby and, for this purpose, the rollers 166 and 166' are journaled on opposite ends of an upright shaft 180 which is supported on the free ends of horizontal levers 181. The latter is fulcrumed on a vertical post 182 upstanding from the base 37. The post also serves as a fulcrum for a second pair of levers 183 whose free ends are clamped by bolts 184 to a shaft 185. Also clamped to the shaft by bolts 186 are arms 187 whose free ends support a shaft 188 on which the rollers 168 and 168' are journaled. Thus, the latter may be urged into driving engagement with the rollers 167 and 167' and by adjusting the levers 183 and the arms 187 on the shaft 185, the rollers 168 and 168' can be moved forward or back relative to the rollers 167 and 167' to direct the bag 30 properly into the clamp 50.

To urge the rollers 166 and 166' toward the rollers 165 and 165' and the rollers 168 and 168' toward the rollers 167 and 167', a horizontal bar 189 spans the shafts 180 and 188 and enlarged ends on the bar abut against these shafts. A pin 190 projects through the center of the bar and is threaded into the post 182 and a compression spring 191 encircling the pin acts between the bar and a washer 192 on the pin. The washer is adjustably held in place by nuts 193 threaded on the end of the pin.

Herein, the conveyor 46 comprises an endless chain 194 (FIGS. 16 and 17) disposed in a horizontal plane with a straight run 195 extending from a point adjacent the accelerator 164 through the filling and closing stations 47 and 48, the return run being behind the run 195. At its forward end, the chain extends around a sprocket wheel 196 (FIG. 4) which is keyed to the shaft 172, the latter being the shaft which drives the accelerator. The other end of the chain extends around a sprocket wheel 197 (FIG. 4a) keyed to the upper end of a vertical shaft 198 which is journaled on the base 37 and driven by the shaft 38 through bevel gears 199. For the sake of rigidity, a second chain 194' also is employed and is disposed below the chain 194 to extend around the roll 196' and a sprocket wheel 197' on the shafts 172 and 198. Spanning the chains at horizontally spaced points are vertical blocks 200 (FIG. 16) which are fastened to the chains by pins 201.

To increase the rigidity further, the two chains 194 and 194' are guided positively along both the active run 195 and the return run. Thus, the rollers 202 (FIG. 18) of the upper chain 194 ride in a track 203 on the active run and in a track 204 on the return run while the lower chain 194' rides in similar tracks 203' and 204'. The lower tracks are defined by elongated bars 205' secured to the base 37 and extending horizontally between the roll 196' and the sprocket wheels 197'. Inturned flanges 206' on these bars engage the rollers 202' of the chain 194' on the outside. On the inside, these rollers ride on the edges of a horizontal plate 207' which spans the roll and the sprocket wheel and is fixed to tubular posts 208 upstanding from the base 37.

As each roller 200' of the chain 194' leaves the roll 196' and enters the run 195, it crosses a gap before the end of plate 207' and bar 205'. This is the point at which each clamp 50 on the conveyor 49 is receiving a bag 30 from the accelerator 164 and, accordingly, means is provided to maintain the rigidity of the chain through this gap. This means comprises an extension 209' of the plate 207' reduced in thickness and received in a slot 210' (FIG. 18) cut in the outer side periphery of the roll 196'. The extension 209' projects forwardly from the end of the plate 207' tangentially of the roll 196'. The upper tracks 203 and 204 are similarly formed by an inside plate 207 and two outside bars 205. In this case, however, the bars are fastened to a bracket 211 which is secured to the post 208.

As shown in FIG. 16, the clamps 50 are mounted on supports 212 which, in turn, are bolted to the blocks 200. Each clamp opens rearwardly and comprises a stationary inner jaw 213 (FIG. 15) and a movable outer jaw 214. The inner jaw is formed by a block and a U-shaped strip 215 of spring steel extends around the leading edge of the block. The inner leg 216 of the spring 215 is fastened to the back of the block 213 while the outer leg constitutes the movable jaw 214. The end 217 of the movable jaw is bent outwardly and the adjacent corner of the block is chamfered at 218 to form a mouth for facilitating the entry of a bag between the jaws. An arm 219 (FIG. 16) depending from the fixed jaw 213 is secured to one of the supports 212 to connect the clamp 50 to the chains 194 and 194'.

To open the clamp 50, one end 220 of an L-shaped lever 221 projects through a slot 222 in the stationary jaw 213 and is fulcrumed on the latter by a vertical pin 223. The pin is formed with a flat edge 224 which normally is even with the jaw 213. When the pin is turned by the lever 221, the flat edge 224 opens the movable jaw 214 as shown in FIG. 14. As the clamp 50 enters on the run 195, a roller 225 journaled on the free end of the lever 221 engages a stationary cam 226 (FIGS. 14 and 18) to swing the lever and open the jaw 214. The cam, which is secured to the bracket 211, is comparatively short and the timing is such that the roller is beginning to ride off the cam as the accelerator 164 inserts the leading edge of a bag between the jaws 213 and 214.

Preferably, a second series of clamps 50' are carried by the conveyor 49 to grip the trailing edges of the bags 30. The clamps 50' are similar in construction to the clamps 50 except that they open forwardly and the corresponding parts are indicated by the same but primed reference characters. The clamp 50' is opened when the roller 225' engages a stationary cam 226' disposed on top of the cam 226. The first part of the cam 226' is coextensive with the cam 226 but the cam 226' extends beyond the cam 226 so that the clamp 50' remains open longer than the clamp 50.

The normal spacing between a clamp 50 and a clamp 50' corresponds to the width of a bag but, as the leading edge of a bag is being gripped by the clamp 50, the other clamp is turning about the center of the sprocket wheel 196 and therefore it trails the clamp 50 by more than a bag width. As the clamp 50' enters on the run 195, it catches up with the trailing edge of the bag and grips this edge. After gripping the bag, the clamp 50' is rocked forward to move the bag edges together and separate the panels 31 preparatory to filling. For this purpose, the arm 219' of the clamp 50' is pivotally mounted on one of the supports 212 by a pin 227 and the vertical position of the clamp is under the control of a roller 228 journaled on one end of an arm 229 whose other end is fixed to the pin 227. As the clamp 50' turns about the sprocket wheel 196, the roller 228 rides between parallel plates 230 (FIG. 18) fixed to the post 208 and positioned to hold the clamp 50' upright. After the clamp enters the run 195, the roller rides down an incline 231 on the end of a bar 232 and then along the underside of this bar to tilt the clamp forward as shown in FIG. 16.

In order that the filling mechanism 52 may enter and fill the bags 30 properly, the mouths of the bags are held open from the time they are formed until the bags reach the filling station 47. To this end, the cross seals 36 stop short of the free upper edges of the folded web 34 to leave narrow flaps 31ª and these flaps straddle an elongated splitter bar 233 (FIGS. 10 and 11). The latter is horizontally mounted on the base 37 and extends from the feed rolls 43 to the cutting station 45. The lower edge portion 234 of the bar is tapered to a comparatively sharp edge to permit the bar to project as far into the bags as possible. A second and similar bar 235 extends from the cutting station 45 to the filling station 47 and holds apart the flaps 31ª on the severed bags as they are advanced by the accelerator 164 and the conveyor 46. As shown in FIG. 11, there is a short gap 236 between the adjacent ends of the splitter bars 233 and 235 to permit the cutter elements 146 and 147 to act on the web and sever the end bag.

To insure that the flaps 31ª of the end bag 30 properly straddle the second splitter bar 235, novel means is provided to close the gap 236 as the end bag moves across the gap and then to open the gap during the cutting operation. This means comprises a disk 237 disposed above the gap in the vertical plane of the web 34 and carrying a plurality of arcuate splitter elements 238, there being two such elements in the illustrated form of the invention. The splitter elements 238 are secured to the periphery of the disk 237 and their arcuate length is sufficient to span the gap 236. The adjacent ends 239 and 240 of the splitter bars are curved to match the curvature of the splitter elements and facilitate the transfer of the flaps 31ª from the bar 233 to the elements 238 and from the latter to the bar 235.

Between the splitter elements 238 are spaces 241 and one of these spaces is alined with the gap 236 each time a cut is made by the knife units 140 and 141. Thus, the leading end 242 of a splitter element enters the gap and is inserted between the flaps 31ª of the end bag as the latter is moving off the splitter bar 233. The gap 236 is narrower than the bag so that the splitter element guides the leading edge of the bag onto the second splitter bar 235 before the trailing edge leaves the first splitter bar 233. Before the cross seal 36 leaves the splitter 233, the trailing edge 243 of the splitter element has entered the gap 236 as shown in FIG. 12. The center 244 of the space 241 then moves into the gap 236 with the center 245 of the seal 36 to permit the seal to be cut. The disk 237 is keyed to a horizontal shaft 246 and is driven one-half a revolution for each cut by the knife units 140 and 141 by the shaft 156 (FIG. 4), the drive being through gears 247, an upright shaft 248 and bevel gears 249.

After the bags 30 have been severed from the web 34 and picked up by the conveyor 46, the latter advances the bags through the filling station 47 where the dispensing mechanism 52 deposits a measured amount of product 250 in each bag. The dispensing mechanism includes a plurality of clamshell buckets 251 which move continuously along an endless path a portion of which coincides with the path of the bags on the conveyor. While the buckets 251 are away from the path of the bags, they receive the product from a measuring device 252 and then, when the buckets are over the bags, one is inserted in each bag. Each bucket enters a bag at the end of the splitter bar 235 which thereby holds the mouth of the bag open for the bucket. Thereafter, the bucket moves at the same speed as the conveyor. The bucket is not opened until it reaches down substantially to the bottom of the bag so that the bucket displaces the air in the bag before the product is deposited and this provides a quick fill which does not produce dusting when the product is a powder.

As shown in FIGS. 19 and 21, the buckets 251 are spaced along an endless chain 253 which has a run 254 extending over a portion of the conveyor 46, this being the run where the buckets are lowered into the bags. From the end of this run the chain extends rearwardly and then reversely around sprocket wheels 255 and 256 where it enters a curved 257. As the buckets move along the curved run, they receive the product from the measuring device 252 which is in the form of a turret whose radius coincides with the radius of the curved run. From the latter, the chain 253 extends around an idler sprocket wheel 258 and back to the straight run 254. Preferably, two chains 253 and 253' are employed and follow identical paths in vertically spaced planes.

The chains 253 and 253' are positively guided along the straight run 254 and the curved run 257. For this purpose, the rollers of the upper chain 253 rides in a guide 259 along the straight run and in a guide 260 along the curved run while similar guides 259' and 260' receive the rollers of the lower chain 253'. The lower guides are fastened to a horizontal plate 261 on opposite sides of a vertical spacer plate 262 which supports a second horizontal plate 263 to which the upper guides are secured. The three plates 261, 262 and 263 are bolted together to form a rigid supporting structure 264 which is fixed to the base of the machine. Each of the guides 259 and 259' is formed by two straight bars 265 and 266 having inturned flanges which define a track for the chain rollers while curved bars 267 and 268 with flanges form the track for the curved run 257.

The chains 253 and 253' are driven from the drive shaft 38 through a chain drive 269 (FIG. 4a), bevel gears 270 and an upright shaft 271 journaled on the base 31. Through a gear train 272 disposed in a gear box 273 on the plate 263, the shaft 271 drives a shaft 274 which extends vertically between the plates 261 and 263 and is journaled on the support 264 at the end of the straight run 254, the sprocket wheels 255 being fast on the shaft 274. The sprocket wheels 256 are journaled in the opposite ends of a vertical post 275 which is fastened to the outer ends of arms 276 mounted to turn about an axis $a$ to tension the chains, the arms then being locked in position by a clamp 277. The third pair of sprocket wheels 258 are journaled in the ends of a post 278 which is carried by the forward end of the support 264.

To carry the buckets 251 on the chains 253 and 253' while supporting them for raising and lowering, vertical guides 279 span and are connected to the chains. As shown in FIGS. 19 and 20, each guide is composed of two vertical channel members 280 spaced apart and facing each other. At their ends, the channels are fixed to blocks 281 which are fastened to the links of the chains 253 and 253'. A slide 282 is disposed between and projects into each pair of channels to slide up and down and a bracket 283 projecting outwardly from the slide supports a bucket 251. The vertical movement of the slides 282 and hence of the buckets 251 is under the control of rollers 284 journaled on the backs of the slides and riding in tracks 285 and 286 extending along both sides of the plate 262. The track 285 is formed by parallel bars 287 set out from the plate 262 by spacers 288 and suitably fastened to the plate. The track 286 is similarly formed by curved bars 289 and spacers 290.

Herein, each of the buckets 251 is composed of two shells 291 and 292 which are U-shaped in cross section and face each other with the flanges of one overlapping the flanges of the other and with the two shells tapering downwardly to a point. The inner shell 292 is stationary and is riveted to the back of the bracket 283 while the outer shell 291 is pivotally supported by pins 293 on the spaced arms 294 of the bracket. The bucket is held closed by a U-shaped spring 295 whose ends are secured to the bracket arms 294 and which bears against the movable outer shell 291. The latter is swung open by a roller 296 carried on one end of an arm 297, the other end being secured to the top of the shell 291. After the bucket has been lowered into a bag 30, the roller 296 rides under a cam bar 298 which is secured to the plate 262 and which depresses the roller 296 relative to the slide 282 to swing the shell 191 out against the action of the spring 295.

As shown in FIG. 20, the product 250 to be packaged, which may be a free flowing powder, is delivered from a suitable source (not shown) to a hopper 299 through an opening 300 in one side thereof. The hopper is secured to and extends around a part of an upright tube 301 which is secured to the base 37 and which provides a support for the plate 261 and, through a bracket 302, supports the plate 263. The product flows by gravity from the hopper 299 through an opening 303 and into the lower end of the tube 301 and the product is raised in the tube by an auger 304 driven by a motor 305 (FIG. 1). At the top of the tube, the product flows out through a lateral opening 306 (FIG. 21) and onto a chute 307 from which it falls into a measuring bucket 308, the overflow returning to the hopper 299.

The measuring buckets 308 are spaced around a turret 309 which turns about the axis of the tube 301. For this purpose, the turret includes a sleeve 310 which is rotatably supported on the tube by an air bearing formed by a collar 311 fixed to the tube and having a flange 312 projecting out under a sleeve 310. Compressed air from a suitable source (not shown) is supplied through a hole 313 connected to a bore 314 in the flange 312. The bore 314 communicates with an annular passage 315 which is formed in the collar 311 and opens outwardly through ports 316 in the collar. Thus, the sleeve 310 turns on a cushion of air. Rotation of the turret 309 is effected by the chain 253 and, to this end, a plurality of arms 317 radiate from the sleeve 310 and are provided on their outer ends with sprocket teeth 318 which project into spaces between the blocks 281. Thus, the turret is turned in synchronism with and at the same speed as the chains 153 and 153'. There is one chute 307 for each bucket 308 and the chutes are supported on the sleeve 310 by brackets 319 to turn with the buckets.

The measuring buckets 308 are filled on the back side of the turret 309 and then the product is leveled in the buckets by an arm 320 (FIG. 21) secured to he inside of a housing 321 which encloses the measuring device 252. The arm 320 is substantially even with the tops of the buckets 308 and brushes the excess product off the buckets and back into the hopper 299. After being leveled, the measuring buckets 308 enter a path above the curved run 257 of the chains 253 and 253' and, at this time, a measuring bucket is disposed over each filling bucket 251 on the curved run 257 and the two sets of buckets are traveling at the same speed. When thus alined, the measuring bucket is opened and the product falls into the filling bucket.

Each of the measuring buckets 308 comprises a tapered shell 322 which is U-shape in cross section and rigidly secured to a bracket 323 projecting radially from the sleeve 310. The open inner side of the shell 322 is closed by a flat plate 324 carried on the lower end of a generally upright lever 325. The latter is fulcrumed intermediate its ends on the sleeve 310 to turn about a horizontal axis and is biased in a direction to hold the plate 324 in the closed position by a torsion spring 326. When the measuring bucket 308 is traveling above a filling bucket 251, the lever 325 is rocked to swing the plate 324 to the open position and transfer the product to the filling bucket. For this purpose, a roller 327 is journaled on the upper end of the lever and engages a stationary cam 328 which is disposed adjacent the curved run 257 and supported by the collar 312. When the product is transferred to the filling bucket 251, the latter advances around the sprocket 258 to the straight run 254 where it deposits the product in a bag.

Figure 22:
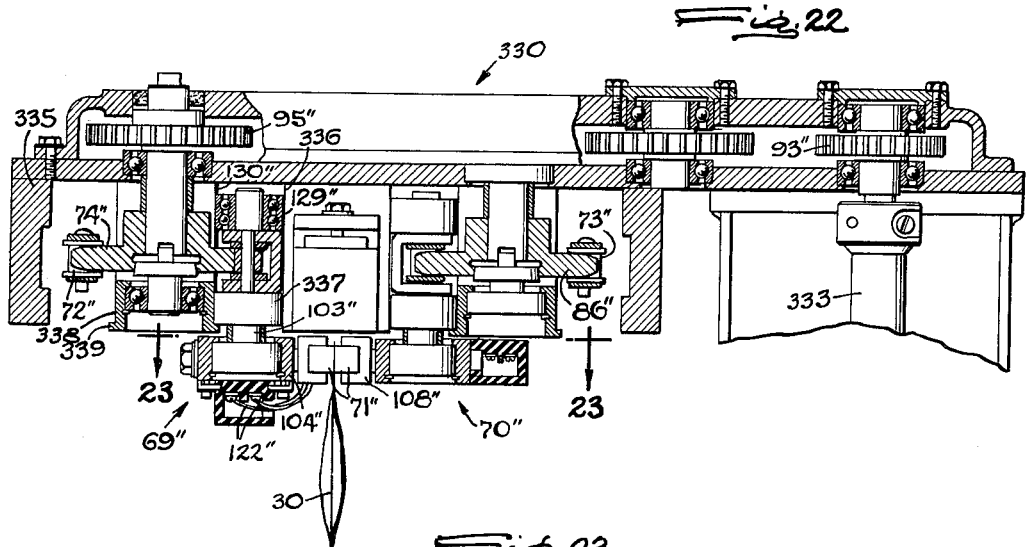
FIG. 22 is an enlarged fragmentary sectional view taken along the line 22—22 in FIG. 1.
Figure 23:
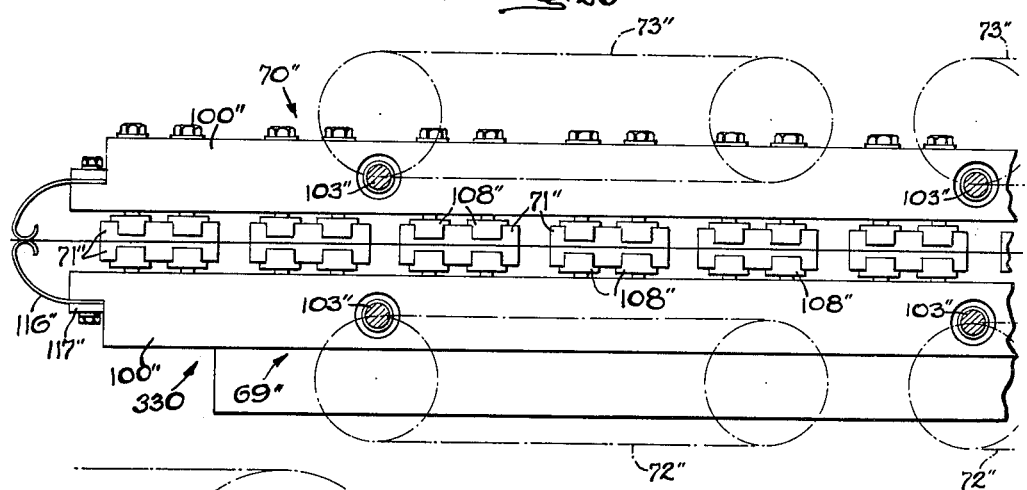
FIG. 23 is a fragmentary sectional view taken along the line 23—23 in FIG. 22.

After the bags 30 have been filled at the station 47, the conveyor 46 advances the bags to the closing station 48. Before the bags reach the latter station, the roller 228 rides up an incline 329 (FIG. 16) on the end of the bar 232 to swing the clamp 50' to its upright position and stretch the top of the bag preparatory to sealing. At the station 48, the top seals 32 are made by a sealing mechanism 330 (FIGS. 22 and 23) which is generally similar to the cross sealing mechanism 51. In this case, however, the eight seal bars 71" disposed on each side of the bags 30 on the conveyor 46 are horizontally disposed to form the top seals on a like number of bags. As in the case of the cross sealing mechanism, the two sets of seal bars 71" are carried by sealing units 69" and 70" which travel in orbital paths.

The sealing units 69" and 70" are generally similar to the upper halves of the sealing units 69 and 70 and the corresponding parts are indicated by the same but double primed reference characters. Thus, the unit 69" is mounted on a pair of chains 72" and includes an elongated horizontal bar 100" supported on the chains by rollers 104" through pins 103". The sealing unit 70" is similarly constructed and is supported by a pair of chains 73". The chains 72" and 73" are driven by sprocket wheels 74" and 86" respectively and these, in turn, are driven from the shaft 38 through a chain drive 331, bevel gears 332 and a vertical shaft 333 journaled on the base 37. The gear drive from the vertical shaft is substantially the same as for the chains 72 and 73 as indicated by the corresponding reference characters but includes an additional idler gear 334.

As in the case of the cross sealing mechanism 51, the rigidity of the seal bars 71" is maintained by guide rollers 129" riding on guides 130". Here, however, bars 335 and 336 are spaced from and parallel the opposite sides of each guide 130" to confine the rollers. Since there is only the upper set of chains in the top sealing mechanism 330, the rigidity is increased by employing an additional set of rollers 337 journaled on the pins 103" below the sprocket wheels. These rollers ride on stationary guides 338 similar to the guides 130" and have flanges 339 projecting under the rollers 337 to prevent the chains from sagging. Flexible leads 122" (FIG. 1) connect the heating elements in the bars 71" the rheostats 340 in the control panel 120.

Figure 24:
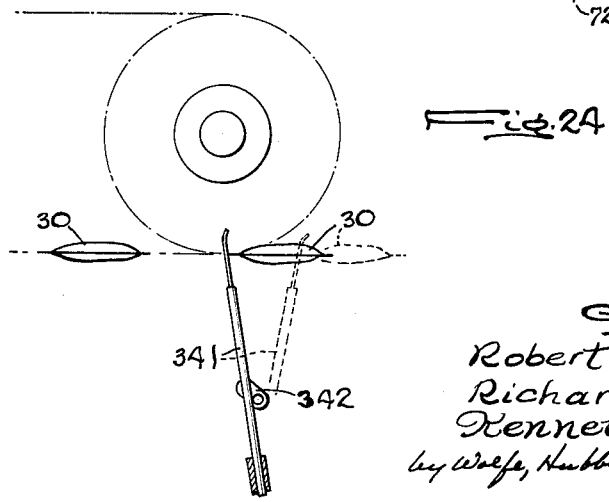
FIG. 24 is a fragmentary plan view of the mechanism for unloading the bags from the machine.

The formation of the top seals 32 at the station 44 completes the bags 30 which are then removed from the end of the conveyor 46 by an oscillating arm 341 (FIGS. 4a and 24). The arm is horizontally disposed to project in behind the end bag on the conveyor 46 and is pivotally supported on a horizontal crank 342. The latter is rotated by the shaft 38 through a chain drive 343 and bevel gears 344 to swing the arm 341 from the solid line position in FIG. 24 to the broken line position thereby kicking the end bag from the machine. Just prior to that, the clamp 50 which was holding this bag was opened by a stationary cam (not shown) engaging the roller 225. Continued rotation of the crank 342 withdraws the arms 341 from the path of the bags and then projects the arm in behind the next bag.

We claim as our invention:

1. Mechanism for heat sealing opposed elongated sheets of packaging material while the sheets are moving endwise and continuously along a predetermined path, said mechanism having, in combination, a first sealing unit disposed on one side of said path and including an elongated support bar paralleling said path, a plurality of sealing bars mounted on and spaced apart longitudinally of said support bar, said sealing bars having sealing faces facing toward and extending transversely of said sheets to form cross seals for a plurality of packages when said faces are pressed against said sheets, a second sealing unit disposed on the opposite side of said path and similarly including an elongated support bar paralleling said path, and a plurality of longitudinally spaced sealing bars having sealing surfaces alined with and opposing the sealing surfaces of said first unit; and means for continuously and orbitally moving said support bars first in parallel relation toward each other to bring said sealing bars into engagement with opposite sides of said sheets, then endwise along said path in parallel relation and at the speed of said sheets, and then away from the sheets and reversely along said path in spaced relation with said sheets whereby said units simultaneously form a plurality of spaced cross seals in said sheets during each orbit of the units.

2. Mechanism as defined in claim 1 in which the sealing bars of said first unit are mounted on the corresponding support bar for individual movement thereon toward and away from said path, and are urged yieldably toward said path.

3. Mechanism for heat sealing opposed elongated sheets of packaging material while the sheets are moving endwise and continuously along a predetermined path, said mechanism having, in combination, a first sealing unit comprising a first pair of endless carriers spaced longitudinally of said path and having alined straight runs extending along one side of the path and parallel to the latter with the remainder of the carriers spaced away from the path, an elongated first support bar paralleling said path and extending along said straight runs, means pivotally connecting said support bar to corresponding parts of said runs whereby said support bar is parallel to said path along said runs and movement of the carriers in one direction imparts an orbital motion to the support bar, and a plurality of first sealing bars mounted on and spaced apart longitudinally of said support bar, said sealing bars having sealing surfaces facing toward and extending transversely of said sheets to form cross seals for a plurality of packages when said surfaces are pressed against said sheets; a second and similar sealing unit disposed on the opposite side of said path in alinement with said first unit and comprising a second pair of endless carriers, a second support bar pivotally connected thereto, and a plurality of second sealing bars mounted on and spaced apart longitudinally of said second support bar and having sealing surfaces alined with and opposing the sealing surfaces of said first unit; and means for advancing said carriers to move said runs in the same direction and at the same speed as said sheets whereby said support bars remain parallel to said sheets along said runs and are moved orbitally first toward each other to bring said sealing surfaces against said sheets, then endwise along and parallel to said path in unison with the sheets to form a plurality of spaced cross seals in the sheets, and then away from the sheets and reversely along said path in spaced relation with the sheets.

4. Mechanism for heat sealing opposed sheets of packaging material while the sheets are moving continuously along a predetermined path, said mechanism having, in combination, a first sealing unit comprising two endless chains spaced longitudinally along said path and having alined straight runs extending along one side of said path with the remainder of the chains spaced away from the path, and elongated support bar paralleling said path and spanning said chains, means connecting said support bar to corresponding parts of said chains whereby the support bar remains parallel to said path but the chains impart an orbital motion to the support bar, and a plurality of sealing bars mounted on and spaced apart longitudinally of said support bar; a second and similar sealing unit disposed on the opposite side of said path in alinement with said first unit and comprising a similar support bar carrying a plurality of sealing bars and similarly mounted on a pair of longitudinally spaced endless chains, said sealing bars having sealing surfaces opposing the surfaces of said first unit, and means for advancing said chains in unison with said sheets whereby said supports remain parallel to said path along said runs and said sealing bars are moved orbitally first in against said sheets, then along said path with the sheets, and then away from the sheets and reversely along said path in spaced relation with the sheets.

References Cited by the Examiner

UNITED STATES PATENTS

| | | | |
|---|---|---|---|
| 947,100 | 1/1910 | Fuller | 83—346 |
| 1,931,362 | 10/1933 | Streine | 83—346 |
| 2,054,406 | 9/1936 | Betts. | |
| 2,759,524 | 8/1956 | Davis | 156—271 |
| 2,800,163 | 7/1957 | Rusch | 156—253 |
| 2,877,121 | 3/1959 | Anderson et al. | 53—180 X |
| 2,916,864 | 12/1959 | Meissner | 53—180 |
| 3,001,348 | 9/1961 | Rado | 53—182 |

FOREIGN PATENTS 1,241,951  8/1960  France.

GRANVILLE Y. CUSTER, Jr., *Primary Examiner.*

ROBERT E. PULFREY, TRAVIS S. McGEHEE, FRANK E. BAILEY, *Examiners.*